United States Patent

Schulz

[11] 3,952,606
[45] Apr. 27, 1976

[54] MARINE GEAR ASSEMBLY
[75] Inventor: Gunter W. Schulz, Peoria, Ill.
[73] Assignee: Caterpillar Tractor Co., Peoria, Ill.
[22] Filed: July 15, 1974
[21] Appl. No.: 488,746

[52] U.S. Cl. .................................. 74/377; 74/325; 74/329; 192/87.17
[51] Int. Cl.² .................... F16H 3/44; F16H 3/08; F16D 19/00
[58] Field of Search ..................... 74/325, 329, 377; 192/87.17

[56] References Cited
UNITED STATES PATENTS

| | | | |
|---|---|---|---|
| 1,292,767 | 1/1919 | Hansen | 74/329 |
| 2,841,023 | 7/1958 | Gorshkoff | 74/377 |
| 3,040,408 | 6/1962 | Schou | 74/377 |
| 3,313,171 | 4/1967 | Nagasaki | 74/377 |
| 3,566,707 | 3/1971 | Schulz | 74/325 X |
| 3,614,999 | 10/1971 | Sommer | 192/87.17 X |

*Primary Examiner*—Samuel Scott
*Assistant Examiner*—Parshotam S. Lall
*Attorney, Agent, or Firm*—Phillips, Moore, Weissenberger, Lempio & Strabala

[57] ABSTRACT

A marine gear assembly has a housing with a disengageable and removable end closure and has a pair of countershafts, transfer gears and a pair of clutches which provide for transmitting drive from an input shaft to an output shaft in either of a forward drive mode and a reverse drive mode. Disposition of the clutches in coaxial relationship with the countershafts and in positions adjacent the removable end closure of the housing enables the clutches to be more easily inspected, serviced or repaired without requiring removal of the marine gear assembly from the normal operating site between the engine and propeller shaft of a ship.

8 Claims, 6 Drawing Figures

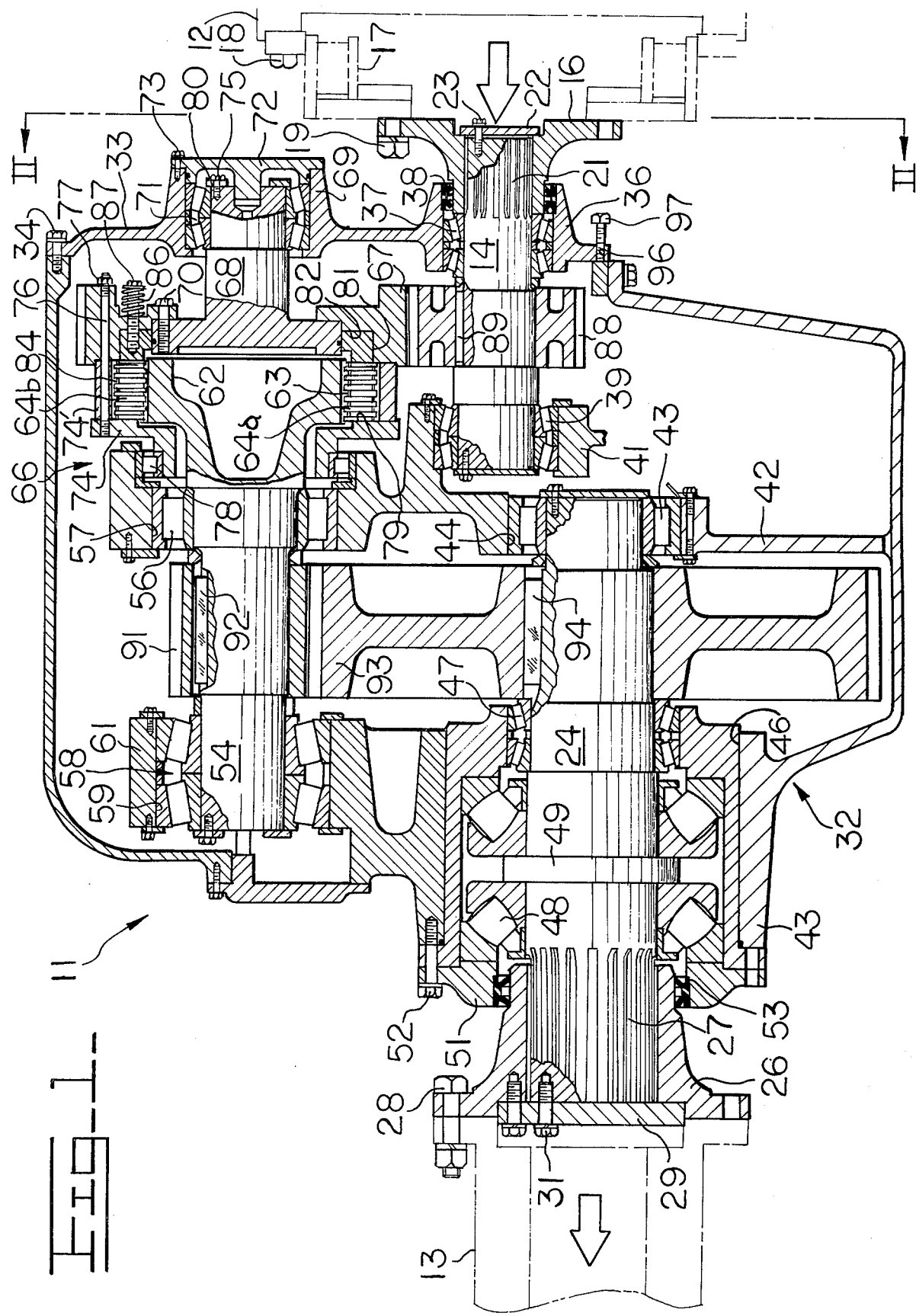

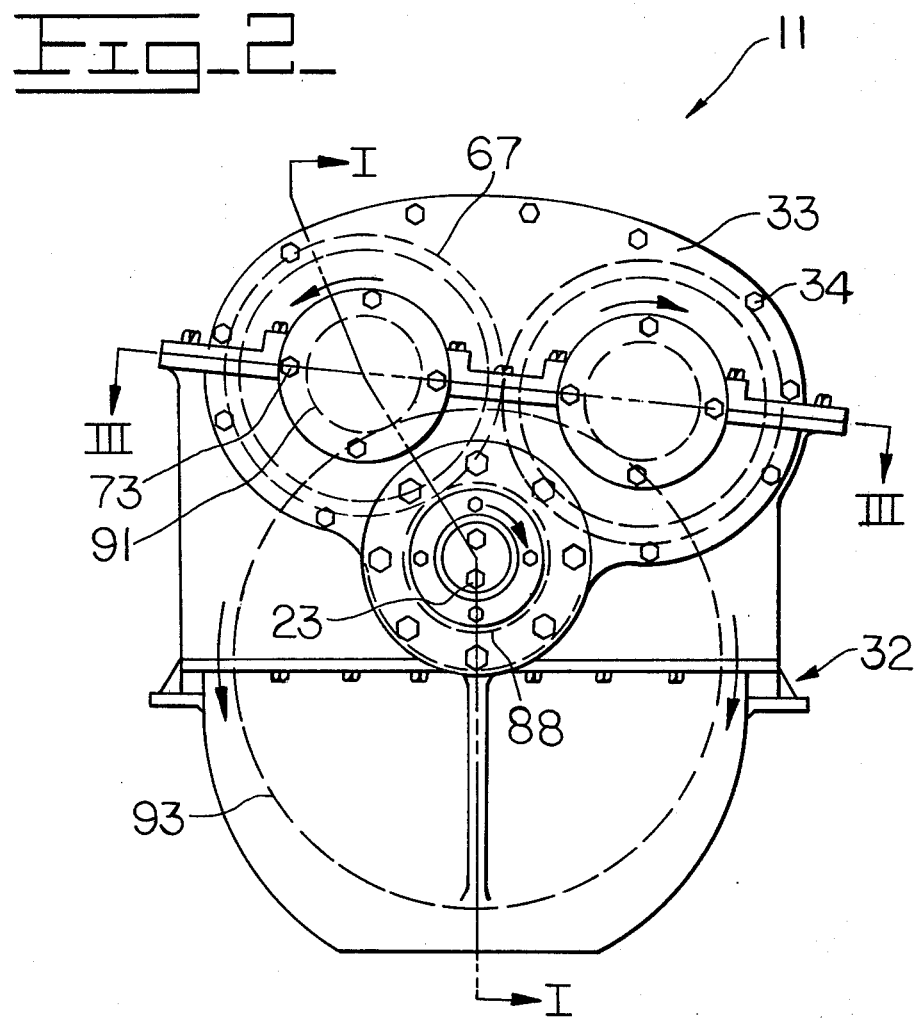

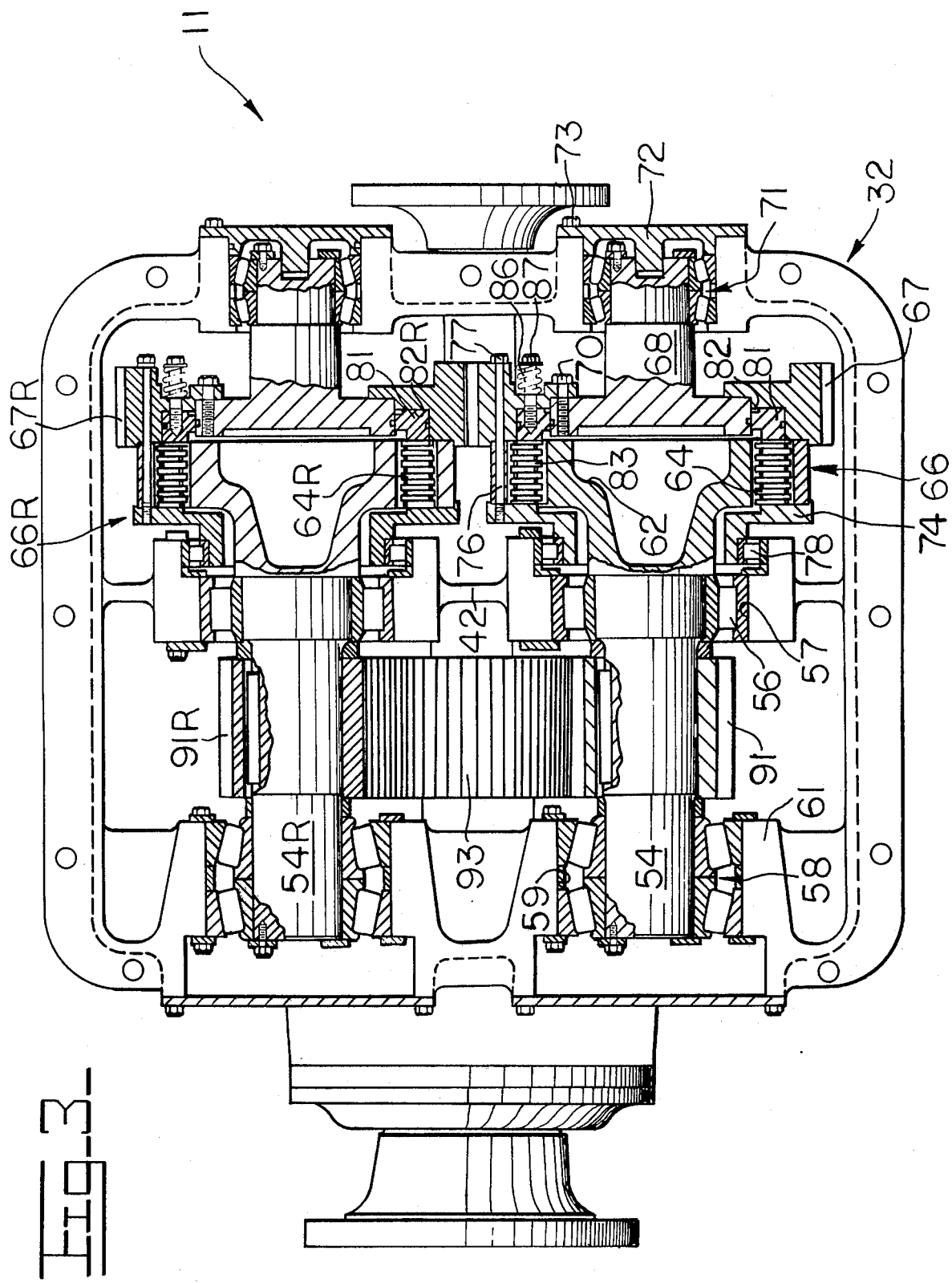

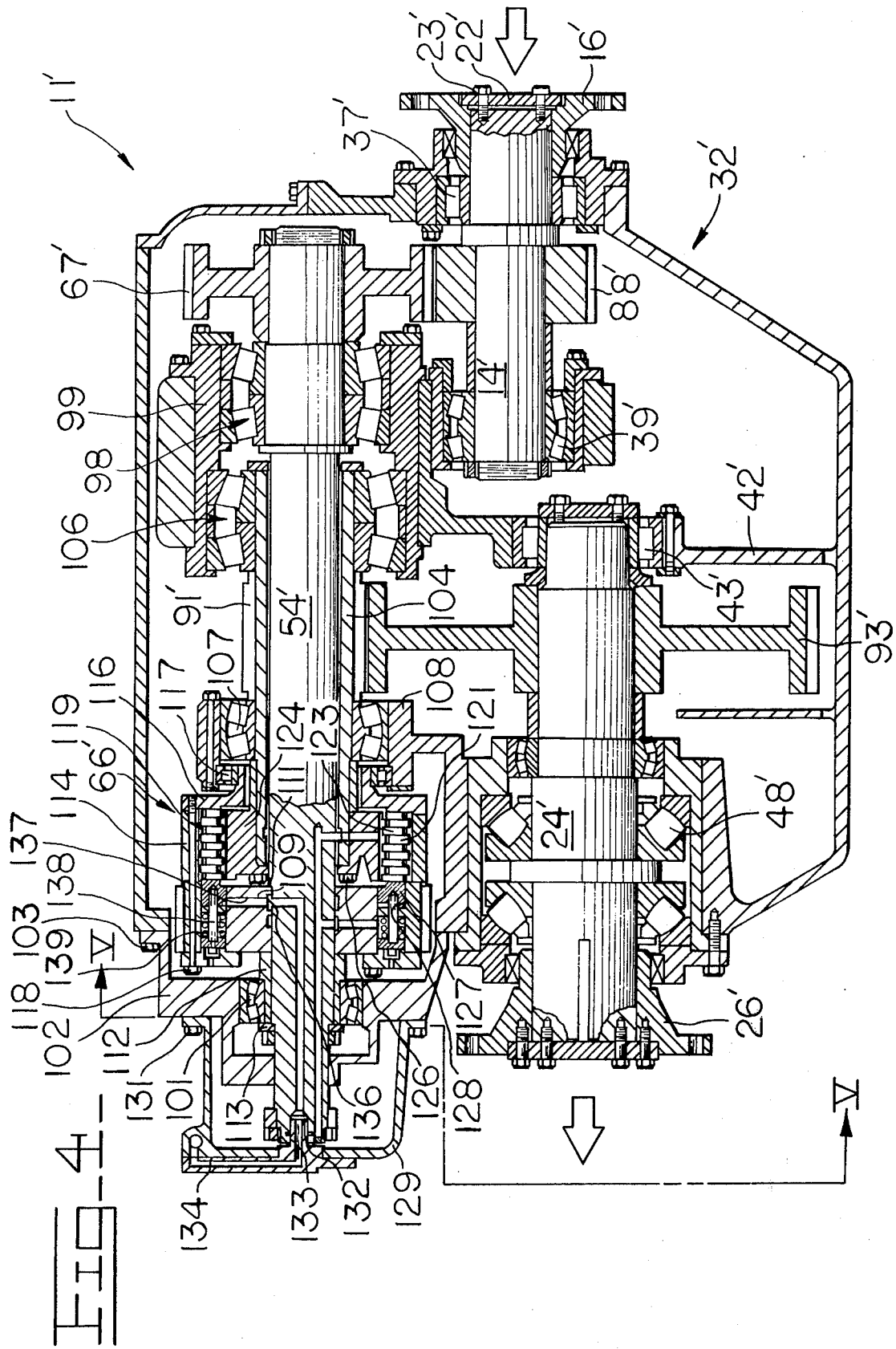

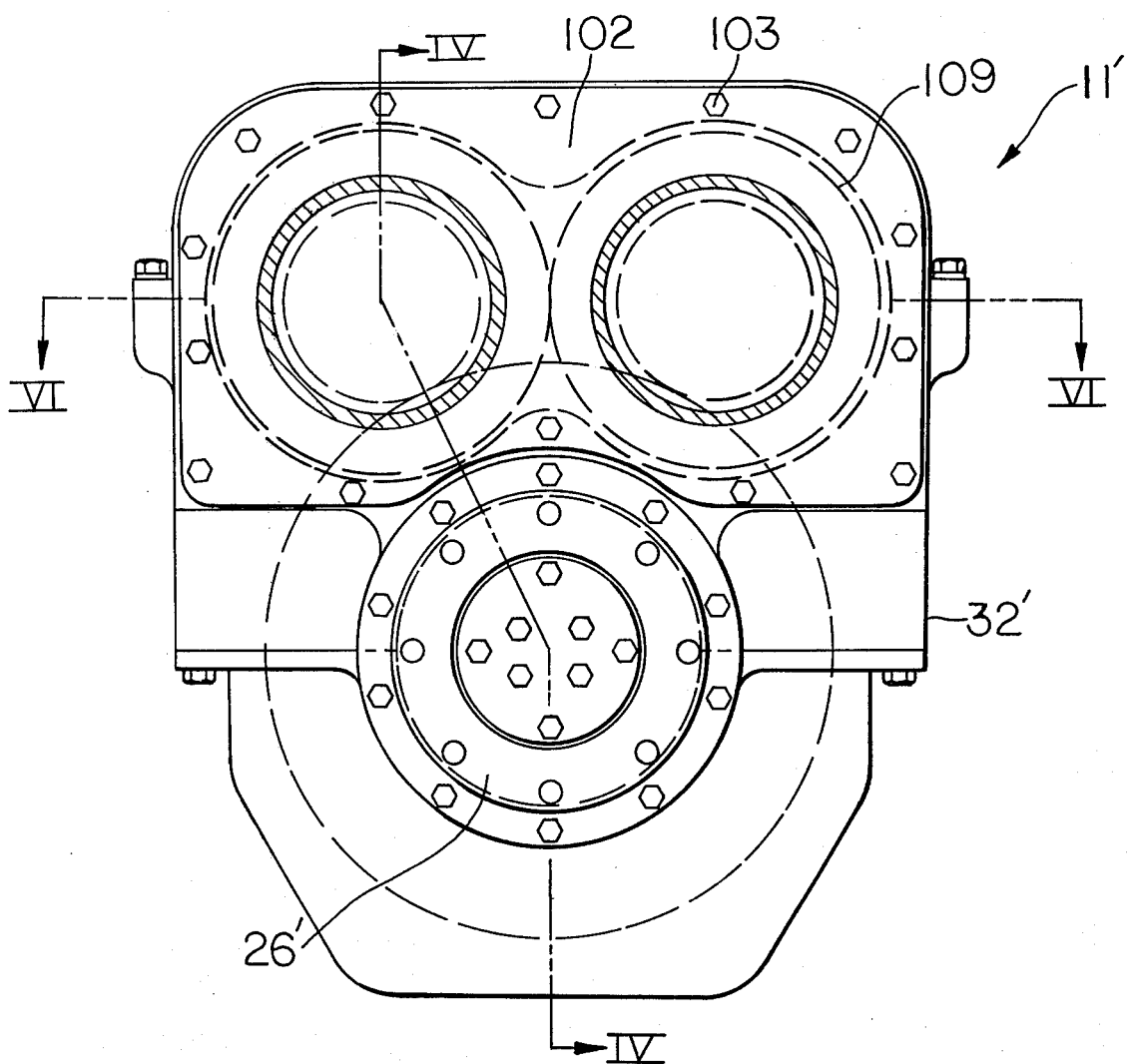

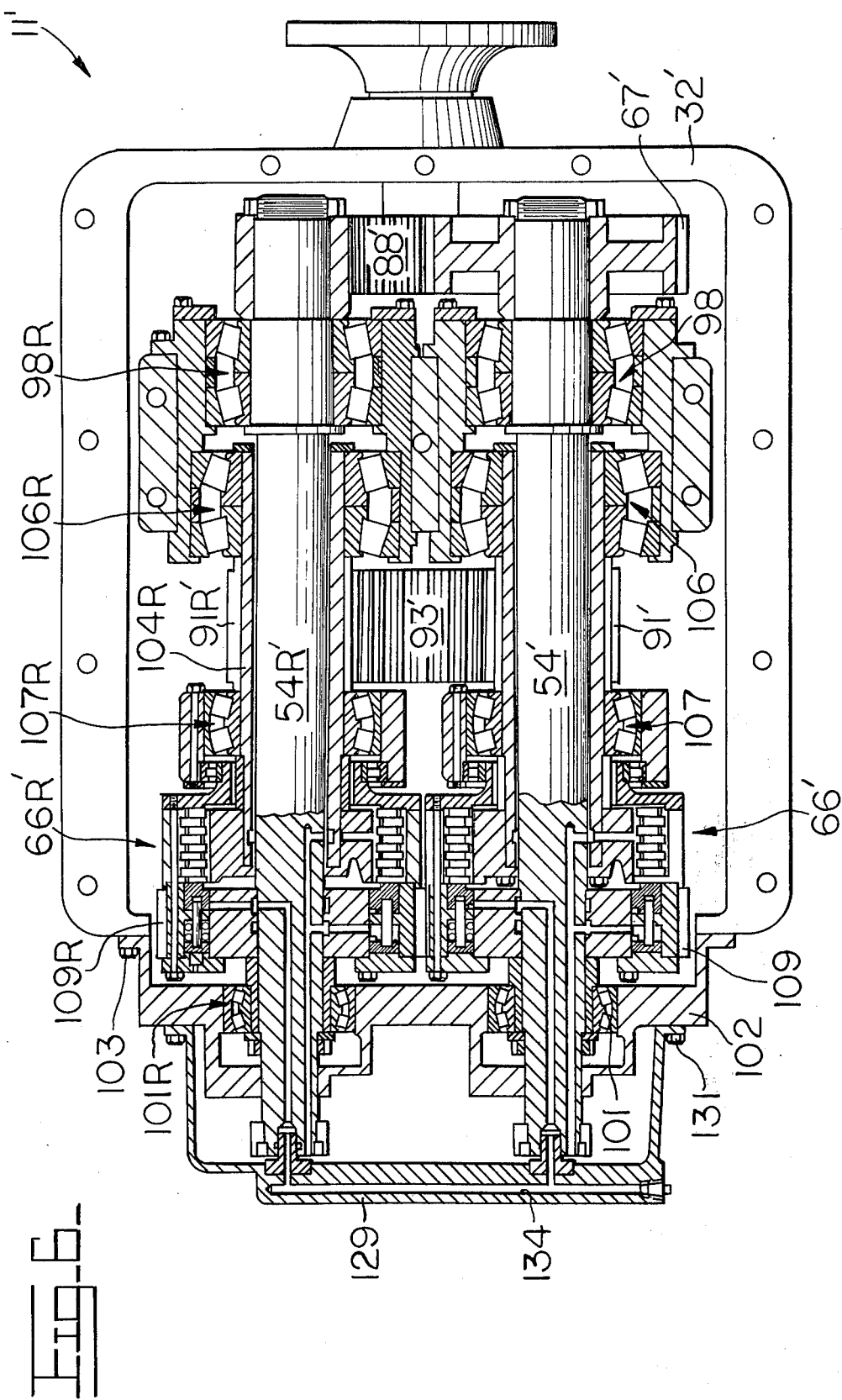

MARINE GEAR ASSEMBLY

BACKGROUND OF THE INVENTION

This invention relates to marine gear assemblies for transmitting torque from an engine to the propeller of a ship. More particularly, the invention relates to a marine gear configuration in which internal clutches are more readily accessible for inspection, maintenance and repair without extensive disassembly and without removing the marine gear from the normal working position in a ship.

Typical prior art marine gears are disclosed in U.S. Pat. Nos. 3,566,707 and 2,841,023.

Marine gear assemblies are utilized in ships to transmit torque from an engine to the propeller shaft. In addition to providing for a speed reduction and accompanying torque increase, such mechanisms include clutches for selectively de-coupling the ship's engines from the propeller shaft and for reversing drive direction when necessary. The clutch plates in marine gear assemblies are subjected to severe wear and thus must be inspected at intervals and must be replaced more often than most other components of the assembly.

Accordingly marine gear assemblies are designed to enable access to the clutch plates but this has heretofore been an undesirably difficult, time-consuming and costly operation. The engine and the propeller shaft of a ship cannot readily be moved to provide the amount of clearance space needed for access to the interior of the marine gear assembly. Consequently, it has been necessary in most cases to disconnect the entire marine gear assembly from the engine and propeller shaft and then to hoist the assembly out of the normal installation bed in the ship to enable access to the internal clutch structure. In other cases where the gear assembly configuration does not make this necessary, a very complicated and time consuming disassembly of much of the mechanism has been required in order to provide access to the clutch plates.

SUMMARY OF THE INVENTION

This invention provides a marine gear assembly configuration in which internal clutches are more readily accessible for inspection or repairs without removing the assembly from the normal installation site within the ship. Briefly, this is accomplished by locating the internal clutch or clutches at one end of the countershafting, apart from the input and output shafts, and in proximity to a removable end closure of the marine gear housing.

Accordingly, it is an object of this invention to simplify the maintenance and repair of marine gear assemblies. It is another object of the invention to provide a marine gear assembly configuration in which internal clutches are accessible for inspection or repair without removing the assembly from the normal installation site within the ship and without requiring extensive disassembly of a large proportion of the mechanism for this purpose.

The invention, together with further objects and advantages thereof, will best be understood by reference to the following description of preferred embodiments taken in conjunction with the accompanying drawings.

BRIEF DESCRIPTION OF THE DRAWINGS

In the accompanying drawings:

FIG. 1 is an elevation section view of a marine gear assembly taken along an angled line I—I shown in FIG. 2, FIG. 2 is a front elevation view of the marine gear assembly of FIG. 1, taken along line II—II thereof, FIG. 3 is a section view taken along slanted line III—III of FIG. 2, FIG. 4 is an elevation section view of a second embodiment of the invention taken along an angled line IV—IV shown in FIG. 5, FIG. 5 is a rear elevation view of the marine gear assembly of FIG. 4, and FIG. 6 is a section view of the marine gear assembly of FIGS. 4 and 5 taken along line VI—VI of FIG. 5.

DESCRIPTION OF PREFERRED EMBODIMENTS

Referring initially to FIG. 1 of the drawing, a marine gear assembly 11 is shown coupled between a ship's engine flywheel 12 and a propeller shaft 13 in order to transmit drive to the propeller shaft in a selected one of forward and reverse drive modes while providing a speed reduction and a corresponding torque amplification.

Assembly 11 has an input shaft 14 connected to flywheel 12 through a front adapter flange 16 and through a stepped annular coupling 17. Coupling 17 is secured to flywheel 12 by bolts 18 and adapter 16 is secured to the coupling by bolts 19. The adapter 16 fits coaxially on the end of input shaft 14 and engages splines 21 thereon, a circular end plate 22 being fastened to the end of the input shaft by bolts 23 to assure retention of the adapter on the shaft.

The marine gear assembly 11 has an output shaft 24 spaced rearwardly from the input shaft and disposed for rotation along an axis which is parallel to that of the input shaft but at a slightly lower level. A flanged annular rear adaptor 26 is disposed coaxially on the back end of output shaft 24 and engages splines 27 thereon, the rear adapter being coupled to propeller shaft 13 by suitable bolts 28. A circular end plate 29, fastened to the back end of output shaft 24 by bolts 31, retains the rear adapter on the shaft.

The components of the marine gear assembly 11, aside from the protruding ends of the input and output shafts and the above described adapters, are enclosed by a housing 32 which may be partially filled with lubricant. Housing 32 has a removable forward end closure 33 which is attached to the remainder of the housing by disengagable means such as bolts 34 and which will be hereinafter discussed in more detail. Input shaft 14 extends through a sleeve 36 formed integrally in end closure 33 and is supported therein by a bearing 37, an annular seal 38 being disposed coaxially in the forward portion of the sleeve to prevent the escape of lubricant. The back end of the input shaft 14 is journalled in a thrust bearing assembly 39 situated within an annular retainer 41 formed in a transverse internal member 42 of the housing.

The front end of output shaft 24 is journalled in another bearing 43 disposed in a passage 44 in housing member 42 and extends backward through a sleeve 46 formed integrally within the rear wall of the housing 32. An additional bearing assembly 47 journals the central portion of the output shaft 24 at the forward end of sleeve 43 and large thrust bearings 48 are also disposed within the sleeve to react against an annular shoulder 49 on the output shaft to resist longitudinal forces thereon. Bearings 48 are retained within sleeve 43 by an annular retainer 51 secured to the back end of the sleeve by bolts 52, an annular oil seal 53 being disposed between the retainer and the rear drive adapter 26.

In the forward drive mode of operation, power is transmitted from input shaft 14 to output shaft 24 through a parallel countershaft 54. Countershaft 54 extends through a bearing 56 mounted in an opening 57 in housing member 42 and is journalled at the back end by a thrust bearing assembly 58 disposed in a passage 59 in a housing member 61 which extends upwardly from sleeve 43. The forward end 62 of countershaft 54 has splines 63 which are engaged by alternate ones 64a of a plurality of axially spaced apart annular clutch plates disposed in coaxial relationship on the forward end of the countershaft and which are constrained to rotate therewith by the splines. Clutch plates 64a are part of a forward drive clutch assembly 66 for selectively causing the countershaft to rotate with a transfer gear 67. Bolts 70 secure transfer gear 67 to an additional rotary element or axle 68 that is coaxial with countershaft 54 and which extends forwardly therefrom into a sleeve 69 formed in end closure 33. The forward end of axle 68 is supported within sleeve 69 by an annular bearing assembly 71 which is itself retained in the sleeve by a circular end cap 72 fastened to the forward end of the sleeve by bolts 73. A retainer ring 80 is fastened to the front end of axle 68 by bolts 75 to constrain the axle against axial movement.

A stepped annular clutch member 74 is secured to transfer gear 67 in coaxial relationship thereto by studs 76 having threaded nuts 77 at the forward end. Clutch member 74 extends rearwardly from transfer gear 67 and is journalled in housing member 42 by another bearing 78. Clutch member 74 encloses clutch plates 64a and forms an annular surface 79 at the back of the clutch plate assembly against which the clutch plates may be axially compressed by backward movement of an annular piston 81 disposed in a conforming chamber 82 in the back surface of transfer gear 67. An additional series of annular clutch plates 64b are alternated with the clutch plates 64a and engage splines 84 on clutch member 74. Clutch piston 81 may be controlled for this purpose by admitting pressurized fluid into chamber 82 through clutch control means known in the art. When piston 81 is forced backwardly to compress the clutch plates in this manner, rotary motion of transfer gear 67 is transmitted to countershaft 54. In the absence of fluid pressure in chamber 82, the clutch is maintained in a fully disengaged condition by springs 86 which urge the piston 81 forward by acting against the heads of bolts 87 which are threaded into the transfer gear and which extend axially through the springs.

Transfer gear 67 engages another transfer gear 88 which is disposed coaxially on the input shaft 14 which is constrained to rotate therewith by a key 89. As it is generally desired that there be a speed reduction and a torque amplification within a marine gear assembly, transfer gear 88 is usually of smaller diameter than transfer gear 67.

Another transfer gear 91, disposed coaxially on countershaft 54 and coupled thereto by a key 92, engages a larger diameter transfer gear 93 disposed coaxially on the output shaft 24 and constrained for rotation therewith by another key 94. With the forward drive clutch 66 engaged as discussed above, rotary drive is transmitted from engine flywheel 12 to propeller shaft 13 through input shaft 14, transfer gears 88 and 67, the forward drive clutch 66, countershaft 54, transfer gears 91 and 93 and output shaft 24. A speed reduction and corresponding torque increase is brought about within the gear assembly because of the relative diameters of the transfer gears. By disengaging the clutch 66, the engine may be decoupled from the propeller shaft.

Referring now to FIGS. 2 and 3, in conjunction, provisions for establishing reverse drive through the marine gear assembly 11 are basically similar to those described above for the forward drive mode except that an additional gear must be present in the power path between the input shaft 14 and output shaft 24 to accomplish the drive reversal. As best shown in FIG. 3 in particular, a reverse drive power path is provided by another countershaft 54R carrying a transfer gear 91R that engages output shaft transfer gear 93 and another clutch assembly 66R formed in part by another transfer gear 67R. Transfer gear 67R engages the corresponding forward drive transfer gear 67 instead of directly engaging a transfer gear on the input shaft as in the previous instance to thereby provide for the extra gear in the reverse power path. As depicted in FIG. 2 in particular, reverse countershaft 54R, transfer gears 91R and 67R and clutch assembly 66R are disposed along a rotational axis displaced to one side and slightly downwardly from that of the corresponding forward drive components but otherwise may have an identical construction to the corresponding elements of the forward drive system and accordingly will not be redescribed in detail. Reverse drive is established by admitting pressurized fluid into the chamber 82R of transfer gear 67R to force piston 81R backwardly to compress clutch plates 64R in the manner previously described.

With the reverse drive clutch 66R engaged in this manner, drive is transmitted from the input shaft 14 through transfer gears 88, 67, 67R, clutch 66R, countershaft 54R, transfer gears 91R and 93 and output shaft 24. Release of pressurized fluid from behind piston 81R disengages this reverse drive power path. Both clutches 66 and 66R are not, of course, engaged at the same time, however, if it is desired to decouple the ship's engine from the propeller shaft, both clutches are disengaged simultaneously.

Referring now again to FIG. 1, the clutch plates may be inspected, serviced, or repaired without removing the marine gear assembly 11 from the depicted working position between engine flywheel 12 and propeller shaft 13 and with a less extensive disassembly of the mechanism than has heretofore been the case. Access to the clutches is obtained by initially removing bolts 18 and 19 at the coupling 17 between the engine flywheel and input drive adapter 16. Coupling 17 may then readily be removed. Bolts 23 are then disengaged and end plate 22 is removed after which adapter 16 is moved forward and removed. Bolts 73 are then disengaged and cover plate 72 is removed enabling bolt 75 and bearing retainer ring 80 to also be removed.

The foregoing steps provide sufficient clearance to allow end closure plate 33 to be shifted forwardly and then removed from the assembly 11. Closure plate 33 has a series of threaded bores 96 around the edge to facilitate this operation as bolts 97 may then be engaged in the bores 96 and may be turned to force the cover plate forwardly. The forward motion of the cover plate 33 accomplished by tightening the bolts 97 distributed around the periphery of the closure plate withdraws bearing assembly 71 from axle 68. With closure 33 removed, nuts 77 may be removed from studs 76 of the clutch assemblies, and bolts 70 may also be removed after which transfer gear 67 including piston 81 and springs 86 may be withdrawn in the forward direction. A separable forward sleeve 74' of clutch member 74 may also be removed if desired although this is not essential to gain access to the clutch plates.

Following the above described operations, the clutch plates 64 may readily be withdrawn from the assembly for inspection and any necessary repairs. The marine gear assembly 11 may then be reassembled by reversing the above described sequence of operations.

In the above described marine gear construction, relatively convenient access to the clutch parts without removing the assembly as a whole from between flywheel 12 and propeller shaft 13 is provided for by situating the clutches near one end of countershafts, rather than at the input and output shafts, in proximity to a removable end closure 33 of the housing. Variations of the general configuration of the marine gear assembly are possible while preserving this advantageous relationship of components. FIG. 4, for example, depicts a modified marine gear assembly 11' in which the clutch assemblies, such as forward clutch 66', are situated near the back end of the countershafts such as countershaft 54'.

The lower portion of marine gear assembly 11' may have a construction essentially similar to that of the first embodiment and accordingly will not be redescribed in detail. Thus, an input shaft 14' extends into a housing 32' and is journalled therein by bearings 37' and 39' and carries a transfer gear 88' and a drive adapter 16' at the forward end for coupling to an engine flywheel as previously described. Similarly, an output shaft 24' is journalled within housing 32' by bearings 43' and 48' and has a drive adaptor 26' at the back end for coupling to the propeller shaft of a ship, a large transfer gear 93' being keyed to the output shaft within the housing.

A forward drive countershaft 54' extends within housing 32' in parallel relationship to the input and output shafts and at a higher level. Countershaft 54' is journalled near the forward end by a bearing 98 mounted in a sleeve 99 which is in turn supported by the transverse internal partition 42' and is journalled near the back end by another bearing 101 mounted in a removable back end closure member 102 which is releasably attached to the housing by bolts 103. Transfer gear 67' is disposed coaxially on the front end of countershaft 54' for rotation therewith and engages the transfer gear 88' of the input shaft to transmit drive from the input shaft to the countershaft. A rotatable sleeve 104 is disposed on the central portion of countershaft 54' in coaxial relationship therewith and is journalled at the front end by a bearing assembly 106 disposed in sleeve 99 and is journalled near the back end by another bearing assembly 107 which is supported in a member 108 attached to the housing 32'. Sleeve 104 carries the transfer gear 91' which engages transfer gear 93' of the output shaft. Forward drive clutch assembly 66' serves to selectively couple sleeve 104 to countershaft 54' to establish forward drive through the marine gear assembly.

Considering now a suitable construction for the forward drive clutch assembly 66', a transfer gear 109 is disposed coaxially on countershaft 54' and seats against a shoulder 111 formed thereon. Gear 109 is retained against shoulder 111 by a sleeve 112 extending coaxially along the countershaft through bearing 101 to abut an annular retainer 113 which is threaded on to the countershaft and retains both the gear sleeve and the bearing in position. An annular element 114 extends forwardly from gear 109 in coaxial relationship therewith to abut an annular hub 116 which is journalled in sleeve 108 by a bearing 117. Hub 116, sleeve 114 and gear 109 are secured together by bolts 118 which extend through all three members. The portion of sleeve 114 forward from gear 109 is provided with internal splines 119 which are engaged by alternate ones of a series of annular clutch plates 121 disposed coaxially within the sleeve. The other clutch plates 121 engage external splines 123 of an annular clutch member 124 disposed coaxially around the back end of the sleeve 104 and which is secured to the sleeve for rotation therewith by bolts 126.

Accordingly, upon axial compression of the clutch plates, sleeve 104 carrying transfer gear 91' is constrained to rotate with countershaft 54' establishing forward drive and if the axial pressure on the clutch plates is relieved, forward drive through the marine gear assembly is interrupted. To provide the pressure required for engaging the clutch 66', an annular piston 127 is disposed in a conforming cavity 128 in the forward face of gear 109. An end cover member 129 encloses the end of countershaft 54' which extends through the bearing 101 and is secured to end closure member 102 by bolts 131. End cover 129 has a pilot projection 132 which extends a short distance into an axial bore 133 in the back of countershaft 54'. A passage 134 extends through end cover 129 including the pilot projection 132 thereof and then along the axis of countershaft 54' and then radially therein to communicate with a groove 136 at the inner surface of gear 109. Radially directed passages 137 in gear 109 communicate groove 136 with piston chamber 128. Thus by supplying pressurized fluid to the passage 134, at the end cover 129, piston 127 may be forced in the forward direction to compress clutch plates 121 and thereby engage the forward drive clutch 66'. To assure that the clutch fully disengages when such fluid pressure is released, pins 138 are threadably engaged in piston 127 and extend rearwardly within gear 109 and a series of compression springs 139 exert a rearwardly directed force on the pins to retract the piston in the absence of fluid pressure thereon.

Referring now to FIGS. 5 and 6 in conjunction, reverse drive through the marine gear assembly 11' is provided for by components associated with a reverse drive countershaft 54R' which extends parallel to the forward drive countershaft 54' at one side thereof. Reverse drive countershaft 54R' is journalled at the forward end by a bearing assembly 98R and at the back end by another bearing assembly 101R, in a manner similar to that previously described for the forward drive countershaft 54'. Similarly a sleeve 104R is disposed coaxially around the central portion of the reverse drive countershaft and is supported by bearing assemblies 106R and 107R and carries a transfer gear 91R' which engages output shaft transfer gear 93'. A reverse drive clutch assembly 66R' provides for selectively coupling sleeve 104R for rotation with reverse drive countershaft 54R', the clutch assembly being similar to the previously described forward drive clutch assembly 66'.

The reverse drive countershaft assembly differs from the previously described forward drive assembly insofar as there is no transfer gear on the forward end of the reverse drive countershaft and thus such countershaft is not directly coupled to the input shaft transfer gear 88'. Instead, the gear 109R of reverse drive clutch assembly 66R' engages the corresponding gear 109 of the forward drive clutch assembly so that the power path to the reverse drive countershaft 54R' from input shaft gear 88' is through the forward drive countershaft 54'. As this introduces an additional gear into the power path through the marine gear assembly 11' relative to that which exists in the forward drive mode of operation, the drive through the assembly is reversed when clutch assembly 66R' is engaged.

Referring now again to FIG. 4, access to the clutches such as clutch 66' is even simpler in this embodiment than in the previous case in that no disconnection of elements at either the input shaft or output shaft is required. Disassembly for access to the clutch plates is accomplished by initially disengaging bolts 131 and removing end cover 129. Bolts 103 may then be disengaged and the end closure member 102 is removed. Retainer 113 is unthreaded from countershaft 54' and 54R'. Bolts 118 may now be disengaged and withdrawn enabling removal of gears 109 including sleeve extensions 114 if desired. This exposes the clutch plates 121 for inspection, repair or replacement. Reassembly of the mechanism is accomplished by reversing the above described steps.

While the invention has been described with respect to certain preferred embodiments it will be apparent that many modifications are possible and it is not intended to limit the invention except as defined in the following claims.

What is claimed is:

1. A marine gear assembly comprising:
   a housing having at least one disengageable and removable end section,
   an input shaft supported for rotation within said housing and having a front end extending therefrom for connection with a source of rotary drive,
   an output shaft supported for rotation within said housing in parallel relationship to said input shaft and having a back end extending therefrom for delivering rotary drive to a driven load,
   a forward drive countershaft journaled for rotation within said housing in parallel relationship to said input shaft and said output shaft and having one end adjacent said removable end section thereof,
   a reverse drive countershaft journaled for rotation within said housing about an axis parallel to that of said forward drive countershaft and also having one end adjacent said removable end section of said housing,
   first and second transfer gears disposed on said input shaft and said output shaft respectively for rotation therewith,
   third and fourth transfer gears disposed on said forward drive countershaft and respectively engaging said first and second transfer gears, one of said third and fourth transfer gears being constrained to rotate with said forward drive countershaft and the other thereof being supported thereon for relative rotation with respect thereto,
   fifth and sixth transfer gears disposed coaxially on said reverse drive countershaft, one of said fifth and sixth transfer gears being engaged with said second transfer gear and the other of said fifth and sixth transfer gears being driven by one of said third and fourth gears,
   forward drive clutch means for selectively constraining said other of said third and fourth transfer gears to rotate with said forward drive countershaft, said forward drive clutch means including annular clutch elements disposed coaxially with respect to said forward drive countershaft in proximity to said removable section of said housing, and
   reverse drive clutch means for selectively constraining said reverse drive countershaft to rotate with said one of said fifth and sixth gears, said reverse drive clutch means including additional annular clutch elements disposed coaxially with respect to said reverse drive countershaft in proximity to said removable section of said housing.

2. The combination defined in claim 1, wherein said forward drive clutch means and said reverse drive clutch means each comprise a first annular clutch member secured to said the associated one of said countershafts for rotation therewith, a second annular clutch member joined to the associated one of said other transfer gears for rotation therewith, a plurality of annular clutch plates disposed between said clutch members, alternate ones of said clutch plates being constrained to rotate with said first member and the other of said clutch plates being constrained to rotate with said second member, and piston means carried in one of said members for selectively applying axial pressure to said clutch plates.

3. The combination defined in claim 2 further comprising an additional pair of rotary elements each being disposed coaxially with respect to an associated one of said countershafts and supporting the associated ones of said second clutch members and said other transfer gears.

4. The combination defined in claim 3, wherein said removable end section of said housing has a pair of bearings mounted therein for supporting the adjacent ends of one of said countershafts and said additional rotary elements.

5. The combination defined in claim 4, wherein said removable end section of said housing is at said front end thereof and said bearings support said additional rotary elements and said second clutch members and said other transfer gears at the front end of said countershafts in coaxial relationship therewith.

6. The combination defined in claim 4, wherein said removable end section of said housing is located at said back end thereof and wherein said bearings support the back ends of said countershafts and said first clutch members and wherein each of said additional rotary elements is a sleeve disposed coaxially around a central portion of the adjacent one of said countershafts.

7. A marine gear assembly comprising:
   a housing having a front and a back end and having a disengagable and removable end closure member at said front end,
   an input shaft supported for rotation within said housing and having a front end extending through said end closure for connection with a driving engine,
   a first transfer gear disposed coaxially upon said input shaft for rotation therewith within said housing,
   an output shaft supported for rotation within said housing and having a back end extending through said back end thereof for delivering rotary drive to a driven load, a second transfer gear disposed coaxially on said output shaft for rotation therewith within said housing, a forward drive countershaft supported for rotation within said housing, said forward drive countershaft being parallel to said input shaft and said output shaft and having a forward end adjacent to said end closure of said housing, a third transfer gear disposed adjacent said forward end of said forward drive countershaft in proximity to said removable end closure and being engaged with said first transfer gear, bearing means mounted in said removable end closure for supporting said third transfer gear, a fourth transfer gear disposed coaxially on said forward drive countershaft for rotation therewith and being engaged with said second transfer gear, forward drive clutch means situated between said forward end of said forward drive countershaft and said third transfer gear, a reverse drive countershaft supported for rotation within said housing and having a forward end adjacent said end closure member, a fifth transfer gear disposed adjacent said forward end of said reverse drive countershaft in coaxial therewith and being engaged with said third transfer gear, a sixth transfer gear being disposed coaxially on said reverse drive countershaft for rotation therewith and being engaged with said second transfer gear, additional bearing means mounted in said end closure for supporting said fifth transfer gear, and reverse drive clutch means situated between said front end of said reverse drive countershaft and said fifth transfer gear.

8. A marine gear assembly comprising:

a housing having a front and a back end and having a disengageable and removable end closure at said back end, an input shaft supported for rotation within said housing and having a front end extending from said front end of said housing for connection to a driving engine, a first transfer gear disposed coaxially on said input shaft for rotation therewith within said housing, an output shaft supported for rotation within said housing and having a back end extending through said back end thereof for delivering rotary drive to a driven load, a second transfer gear disposed coaxially on said output shaft for rotation therewith within said housing, a forward drive countershaft supported for rotation within said housing, said forward drive countershaft being parallel to said input shaft and said output shaft and having a back end adjacent said end closure of said housing, bearing means in said end closure for supporting said back end of said forward drive countershaft, a third transfer gear disposed coaxially on said forward drive countershaft for rotation therewith and being engaged with said first transfer gear, a fourth transfer gear disposed coaxially with respect to said forward drive countershaft and supported for rotation relative thereto and being engaged with said second transfer gear, forward drive clutch means for selectively causing said fourth transfer gear to rotate with said forward drive countershaft, said forward drive clutch means being adjacent to said end closure of said housing, a reverse drive countershaft supported for rotation within said housing, said reverse drive countershaft being parallel to said forward drive countershaft and having a back end adjacent said end closure of said housing, additional bearing means in said end closure for supporting said back end of said reverse drive countershaft, a fifth transfer gear disposed coaxially on said reverse drive countershaft and being engaged with said fourth transfer gear, a sixth transfer gear disposed coaxially on said reverse drive countershaft and being engaged with said second transfer gear, and reverse drive clutch means for selectively causing said sixth transfer gear to rotate with said fifth transfer gear, said reverse drive clutch means being adjacent said end closure of said housing.

* * * * *

Disclaimer 3,952,606.—*Gunter W. Schulz*, Peoria, Ill. MARINE GEAR ASSEMBLY. Patent dated April 27, 1976. Disclaimer filed Mar. 30, 1978, by the assignee, *Caterpillar Tractor Co.*

Hereby enters this disclaimer to claims 1–6 and claim 8 of said patent.

[*Official Gazette May 23, 1978.*]